Feb. 21, 1950     C. E. HEMMINGER     2,497,940
CONVERSION PROCESS
Filed June 20, 1944
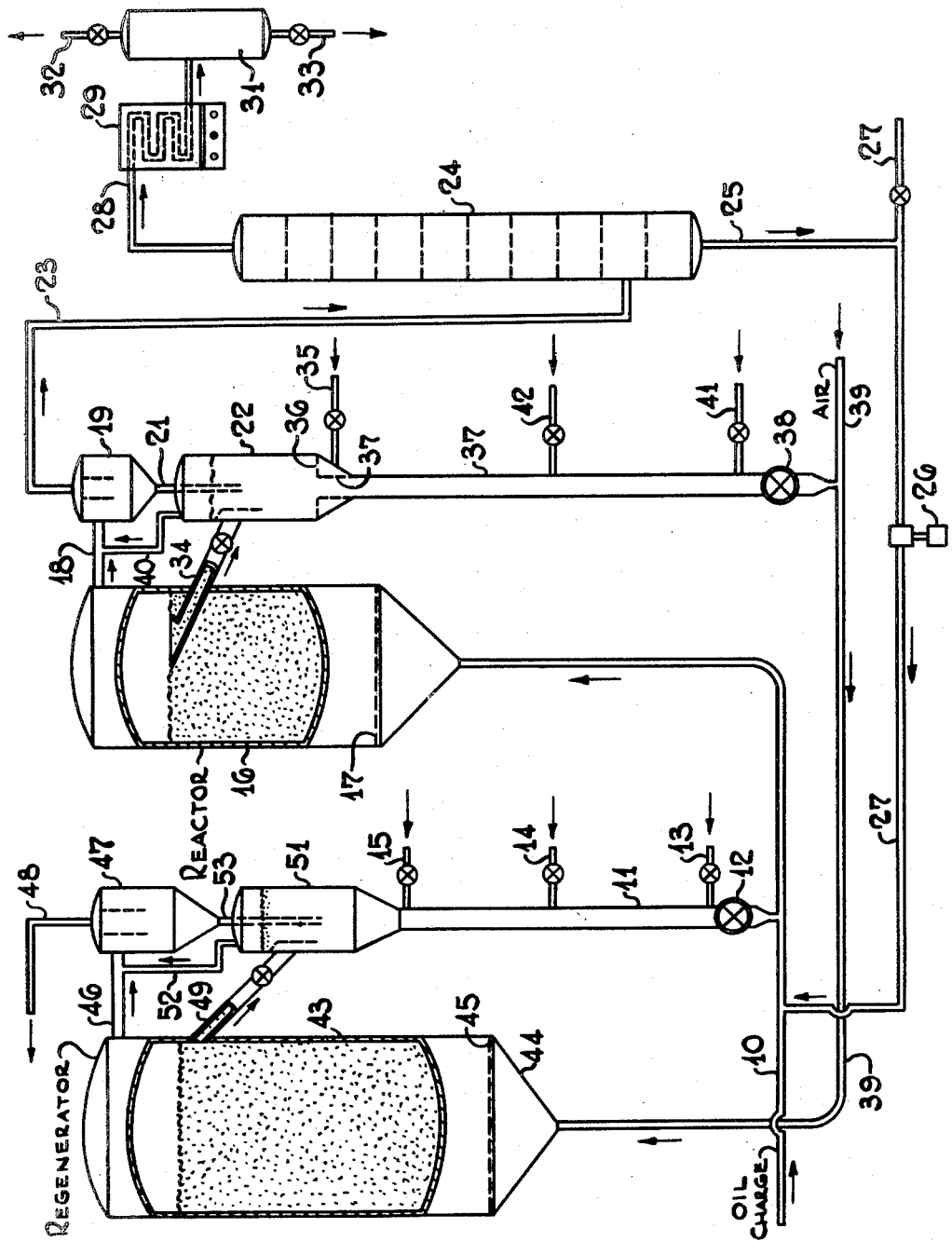
Charles E. Hemminger   Inventor
By *R. L. Young* Attorney Patented Feb. 21, 1950

2,497,940

UNITED STATES PATENT OFFICE 2,497,940

CONVERSION PROCESS

Charles E. Hemminger, Westfield, N. J., assignor to Standard Oil Development Company, a corporation of Delaware Application June 20, 1944, Serial No. 541,179

8 Claims. (Cl. 196—52)

This invention relates to a catalytic conversion process wherein a gaseous reagent is caused to react with or in the presence of a finely divided solid material and pertains more particularly to a process in which the gaseous reactants pass upwardly through a reaction chamber containing a finely divided solid material at relatively low velocity controlled to maintain a relatively dense, turbulent layer of the finely divided solid material in the bottom portion of the reaction chamber.

While the invention in some of its broader phases may have a more general application, such as in the reduction of ores, in the drying and calcining of finely divided solids, and in the purification of gases, it finds particular application in the catalytic conversion of hydrocarbon oils and particularly in the catalytic cracking of such oils.

It has heretofore been known to crack oils by passing the oil into the bottom section of an enlarged vertical reaction chamber through which a stream of finely divided conversion catalyst is passed. In some cases the finely divided catalyst is intermixed with the oil and the resulting suspension of oil vapors and catalyst is introduced into the reaction chamber, and in other cases the catalyst is introduced as a separate stream into the reaction chamber. In either case the velocity of the oil vapors within the reaction chamber is reduced to such a point that a relatively dense, turbulent phase of catalytic material and vapors undergoing reaction is maintained in the lower portion of the chamber. For example, when using finely divided adsorptive clay-type catalysts having a particle size of from 1 to 100 microns, superficial velocities of the order of from 1 to 2 feet per second are sufficient to maintain a dense, turbulent mixture of catalyst in the bottom of the chamber having a density of the order of from 5 to 20 pounds per cubic foot.

The term "superficial velocity" as mentioned above means the velocity the oil vapors would attain if no solid materials were contained within the chamber.

According to one mode of operation, the catalytic material is removed overhead from the reaction chamber in admixture with the vaporous products and the catalyst is subsequently separated therefrom by means of cyclone separators or other suitable separating equipment. The separated catalyst is then introduced into a regenerating zone where it contacts a stream of oxidizing gas which burns the combustible deposits formed on the catalyst during the cracking treatment. The regeneration is normally carried out in the same general manner as the cracking treatment, namely, by passing the oxidizing gas upwardly through the regenerating zone at a low velocity controlled to maintain a dense, turbulent layer in the bottom portion of the chamber. The regenerated catalyst is subsequently returned to the reaction chamber for further use. The pressure lost during circulation of the catalyst through the reaction and regenerating zones may be restored by interposing a standpipe between the reactor and the regenerating zone through which the catalyst passes at relatively high density, such as from 20 to 40 pounds per cubic foot.

It has previously been found, for example, that by maintaining a small amount of an aerating or fluidizing gas in admixture with the catalyst within the standpipe so that the catalyst particles are surrounded by a thin film of gas the resulting mixture behaves as a fluid capable of exerting a true hydrostatic pressure. This pressure is utilized for restoring the pressure on the powder being circulated through the cracking and regenerating zones.

The process previously described is now commonly known as the fluid catalyst process due to the fact that the finely divided catalyst is maintained in a truly fluid state during circulation through the system. In one of my earlier applications Serial No. 410,526, filed September 12, 1941, now Pat. No. 2,379,711, I have described a modification of the above process in which a separate stream of catalytic material is withdrawn from the dense layer or phase of catalytic material in the cracking and regenerating zones directly into the standpipes. This reduces the amount of catalyst contained in the reaction products leaving the top of the chambers and reduces the amount of separating equipment which would otherwise be required to separate the powder from the gases. One disadvantage of this method of operation, however, is that the separate stream of catalyst removed from the reaction chamber contains substantial amounts of vaporous or volatilizable reaction products entrained in the catalyst or absorbed thereby. This material if passed directly to the regenerating zone not only reduces the yield of valuable products obtained from the process but increases the amount of heat liberated during regeneration and this, in turn, reduces the capacity of the unit.

One of the important objects of the present invention is to provide an improved fluid catalyst process of the type above described which not only reduces the amount of recovery equipment required but also reduces the amount of volatile material passing to the regenerator.

Other more specific objects and advantages of the invention will be apparent from the detailed description appearing hereinafter in which reference will be made to the accompanying drawing which is a diagrammatic illustration in side elevation of an apparatus suitable for carrying out the invention.

Referring to the drawing, the reference character 10 designates a charge line through which the oil to be processed is introduced into the system. This oil may be a relatively high boiling petroleum fraction such as a gas oil or a topped or reduced crude, or in some cases it may be a naphtha or gasoline fraction which is to be subjected to refining treatment to improve the quality thereof. The oil introduced may be at substantially room temperature, or it may be vaporized or subjected to preliminary heating before being introduced through line 10.

The oil passing through line 10 is intermixed with hot regenerated catalyst discharging therein through a vertical standpipe 11 having a control valve 12 for controlling the rate of flow of the catalyst into the oil stream. The catalyst so introduced is preferably in a finely divided state and may have a particle size such as, for example, from 1 to 200 microns. The catalyst may be any suitable catalyst capable of bringing about the desired reaction, such as activated clays or synthetic gels comprising silica-alumina, silica-zirconia, silica-magnesia, or alumina-boria. These materials are well-known cracking catalysts and it will be understood that the invention is not restricted to the particular type of catalyst used in the operation. As illustrated, a small amount of an aerating gas is preferably introduced into the column 11 at one or more spaced points through lines 13, 14 and 15 to maintain the catalyst particles in a fluid state. The amount of air introduced may be sufficient to provide a mixture within the standpipe having a density of the order of from 25 to 40 pounds per cubic foot, depending upon the density and size of the catalyst particles. The catalyst so introduced may be in the form of small spheres specially prepared or it may be ground absorbent material.

The catalyst introduced into the oil stream is preferably at substantially regenerating temperature, such as of the order of from 1000° F. to 1200° F., and the amount introduced may be sufficient to supply the heat requirements for the cracking operation. To this end the amount of catalyst introduced may be sufficient to form an equilibrium oil-catalyst slurry having a temperature of from 850° F. to 1000° F. or more. The resulting mixture of catalyst and oil which is vaporized by contact with the hot catalyst discharges from line 10 into the bottom of a vertical reactor 16. The reactor 16 may be provided with a conical bottom section forming a distributing zone for distributing the suspension uniformly over the full cross-sectional area of the catalyst. The reaction chamber 16 may also be provided with a perforated grid 17 through which the suspension of oil vapors and catalyst passes into the main body of the reaction chamber. The velocity of the oil vapors being introduced into the reaction chamber 16 is preferably reduced to such a point as to cause the catalyst to segregate in the bottom section of the reaction chamber 16 into a relatively dense mass which is maintained in a highly turbulent state by the oil vapors rising therethrough. To this end the superficial velocity of the oil vapors rising through the reactor may be of the order of from 0.5 to 3 feet per second and preferably about 1.5 feet per second when using a catalyst having a particle size of from 1 to 100 microns. Under such conditions the catalyst would normally segregate into a turbulent phase having a density of from 5 to 20 pounds per cubic foot.

When operating as above described, a substantially uniform temperature is maintained throughout the main body of the catalytic material. This temperature may be of the order of from 900° F. to 1000° F. or more when processing gas oils or reduced crudes. The time of contact of the oil vapors with the catalyst in the dense fluidized layer of catalyst may be of the order of from 5 to 50 seconds. The weight space velocity as measured in the amount of oil treated per hour per weight of catalyst in the reactor may range from 0.5 to 10, preferably between 3 and 6.

Under carefully controlled conditions the relatively dense fluidized layer of catalytic material within the reactor 16 is superimposed by a relatively dilute phase of reaction products containing a small amount of catalytic material entrained therein, and a relatively sharp interface may exist between the dense and dilute phases. The vaporous reaction products after passing through the reaction chamber 16 are removed overhead through line 18 to a cyclone separator 19 or other equivalent device for separating entrained powder from the vaporous reaction products. The catalyst separated in the separator 19 discharges through line 21 into a stripping hopper 22 below the level of catalytic material contained therein.

The vaporous reaction products are removed from cyclone separator 19 through line 23 and may be passed to a primary fractionating tower 24 in which they are subjected to initial fractionation to separate the insufficiently converted constituents therefrom. The condensate formed in tower 24 may be withdrawn from the bottom thereof through line 25 and may be returned by means of pump 26 to the charge line 10 for re-cracking. If desired, a part or all of the cycle oil may be withdrawn through line 27. The cycle oil removed from the bottom of the tower 24 will normally contain a small amount of entrained powder not removed by the cyclone 19. In some cases it may be desirable to pass the condensate through a settling chamber, a centrifugal separator or a filter for removing the catalyst and thereafter returning the catalyst to the cracking operation. If desired, the fractionating tower 24 may be provided with suitable trap-out trays (not shown) for segregating fractions of different boiling point formed within the fractionating tower.

Vapors remaining uncondensed in the fractionating tower 24 are removed overhead through line 28 to a condenser 29 in which normally liquid constituents including a gasoline fraction may be condensed. The products from the condenser 29 may then pass to a product receiver 31 in which liquid distillate is segregated from the uncondensed gases. The uncondensed gases may be removed overhead from the receiver 31 through line 32 and may be passed to suitable recovery equipment for fractionation and separation of the gases into the desired components. The liquid distillate is removed from the receiver 31 through line 33 and may be subjected to further finishing treatment, such as acid treatment, doctor treatment, recracking or refining, to produce a motor fuel of the desired quality.

Returning to the reactor 16, a separate conduit 34 projects inwardly from the side walls of the reaction chamber 16 into the upper portion of the reactor. This conduit may terminate within the reactor in the form of a cone as illustrated and the lower end discharges into the stripping hopper 22. This conduit 34 serves as an overflow conduit through which a relatively dense stream of catalyst containing entrained and absorbed vapors is removed from the reaction chamber separately and independently of the relatively dilute stream of oil vapors and catalyst removed from the reaction chamber through conduit 18. If desired, a plurality of vertical conduits 34 may be provided, arranged in vertically spaced relation to permit the maintenance of different levels of the dense, turbulent phase within the reaction chamber 16. As a further alternative, the conduit 34 may be provided with a valve as shown to regulate the rate of flow of the catalyst from the reactor. In such case, the level of the dense catalyst phase within the reactor 16 need not coincide with the conduit 34 but may extend thereabove.

The catalyst discharging through conduit 34 into the hopper 22 is subjected to stripping treatment for removing vaporous hydrocarbons intermixed with the catalyst withdrawn through the conduit 34 and for vaporizing the volatilizable constituents contained on the catalyst or absorbed therein. Line 34 may project downward in hopper 22 to form a seal against gases therein. To this end, a stripping gas such as steam, spent combustion gases, or the like may be introduced into the bottom section of the hopper 22 through line 35. The bottom of the hopper 22 may be in the form of an inverted cone having an annular perforated grid 36 surrounding a conduit 37 which projects upwardly into the bottom portion of the stripping zone and serves to withdraw the catalyst from the hopper. The stripping gas may pass upwardly through the grid at a velocity to maintain the catalyst within the hopper in a fluid state. This velocity may, for example, be of the order of from 1 to 10 feet per second. The stripping gas after passing through the catalyst within the hopper 22 is withdrawn overhead through line 40 which may merge with the conduit 18 wherein the stripping gas intermixes with the vaporous products withdrawn from the reactor 16. The catalyst discharges from the hopper 22 through vertical conduit 37 which serves as a standpipe for generating pressure on the catalyst lost during passage through the reactor 16.

The catalyst discharges from the base of the column or standpipe 37 through a control valve 38 into a stream of air passing through line 39. A small amount of an aerating gas is preferably introduced at one or more spaced points in column 37 through lines 41 and 42 so as to maintain the catalyst within the column in a fluid state capable of generating a hydrostatic pressure. To this end, the amount of gas so introduced may be sufficient to maintain a density within the column of the order of from 25 to 40 pounds per cubic foot when employing the finely divided clay-type catalyst hereinbefore mentioned.

The catalyst introduced into the stream of air passing through line 39 is transferred into the bottom section of a regenerator 43 which is of a construction similar to the reactor 16. For example, the regenerator 43 may be provided with an inverted cone section 44 having a perforated grid 45 superimposed thereabove through which the mixture of air and catalyst to be regenerated is introduced into the main body of the reaction chamber. The catalyst is subjected to oxidation within the regenerator 43 to remove combustible deposits formed thereon. The spent combustion gases resulting from burning of the combustible deposits are removed overhead from regenerator 43 through line 46 which leads to a cyclone separator 47 for removing a small amount of entrained catalyst contained therein. The spent combustion gases after passing through the cyclone separator 47 are removed through line 48 and may be passed through further recovery equipment for final separation of the remaining catalyst therefrom before being vented to the atmosphere.

The regenerator 43 is also provided with a conduit 49 for removing a stream comprising a mixture of catalyst and spent combustion gases separate and independent from the stream passing to the cyclone separator 47. This stream will be considerably more dense than the stream of gases passing through the cyclone 47, as previously described in connection with reactor 16. The stream removed from the regenerator 43 through line 49 discharges into a hopper 51 positioned above the vertical conduit 11 hereinbefore described and is sealed therein. As previously mentioned in connection with reactor 16, a plurality of withdrawal conduits arranged in vertically spaced relation may be provided for effecting control of the level of the dense catalyst phase in the regenerator 43. Also, the rate of withdrawal may be controlled to maintain the level above the outlet conduit 49. The regenerated catalyst may be retained within the hopper 51 for a period sufficient to permit separation of the spent combustion gases intermixed with the catalyst discharged therein. The spent combustion gases so separated together with any excess aerating gas introduced through lines 13, 14 and 15 are removed from the top of the hopper 51 through line 52 which may merge with line 46 leading to the cyclone 47. The catalyst separated in the cyclone separator 47 discharges through conduit 53 into the hopper 51. The regenerated catalyst collected in the hopper 51 discharges through the vertical conduit 11 into the oil stream, as previously described.

The valves 12 and 38 located in the standpipes 11 and 37, respectively, may be controlled to maintain any desired level within the hoppers 51 and 22, respectively. For example, the level may be maintained above the point of entry of the stream of catalyst into the hopper as illustrated, or in some cases the level may be maintained below the point of entry of the catalyst therein.

From the foregoing it will be apparent that the present invention provides a method of separately removing a stream of catalyst from the reactor and regenerator separate and independent of the main stream of reaction and regeneration products removed therefrom. Furthermore, the stream of catalyst removed from the reactor may be subjected to separate stripping in an independent stripping zone to remove the cracked vapors from the catalyst prior to discharging the same into the air stream leading to the regenerator.

Having described the preferred embodiment of the invention, it will be understood that it embraces such other variations and modifications as come within the spirit and scope thereof.

What is desired to be protected by Letters Patent is:

1. A continuous process for contacting gaseous reagents with finely divided solids which comprises passing a stream of gaseous reagents upwardly through a reaction chamber, introducing a stream of finely divided solids to be contacted into said reaction chamber, limiting the velocity of the gases rising through said chamber to maintain a relatively dense turbulent layer of finely divided solids in the bottom portion of the reaction chamber and superimposed on said layer a relatively dilute phase of gaseous reaction products containing a small amount of finely divided solids entrained therein the upper portion of the reaction chamber, withdrawing a stream of said gaseous reaction products containing a relatively small amount of entrained finely divided solids from the upper end of said reaction chamber, separating entrained solids therefrom, continuously separately removing from the reaction chamber a restricted stream of solids containing entrained gaseous reaction products only from a portion of said dense layer within the reaction zone substantially above the bottom thereof, passing the last-named stream into a stripping zone, said stripping zone being independent of the dilute phase in the reaction chamber, continuously contacting the solids within said stripping zone with a stripping gas to remove gaseous reactants entrained therein, and subsequently discharging the stripped solids from said stripping zone.

2. In a process defined by claim 1, the further improvement which comprises combining the stripping gas containing the entrained gaseous reaction products with said stream of gaseous reaction products withdrawn from said reaction chamber.

3. In a process for the catalytic conversion of hydrocarbon oils wherein the oil in vapor form is passed upwardly through a conversion zone into which a stream of finely divided conversion catalyst is continuously passed and wherein the velocity of the oil vapors passing upwardly through the conversion zone is limited to maintain a relatively dense layer of finely divided conversion catalyst in the bottom portion of the conversion zone superimposed by a relatively dilute phase of reaction products containing entrained conversion catalyst in the upper portion of the conversion zone, the improvement which comprises removing reaction products and entrained catalyst from the upper end of said conversion zone, segregating the entrained catalyst from the reaction products, continuously separately removing a restricted stream of finely divided conversion catalyst containing entrained vaporous reaction products only from a portion of said relatively dense layer within said conversion zone substantially above the bottom thereof, passing said last-named stream to a stripping zone, said stripping zone being independent of the dilute phase in the conversion zone, continuously passing a stripping gas in contact with said conversion catalyst within said stripping zone to remove entrained vaporous reaction products therefrom, passing the stripped conversion catalyst through a regenerating zone to restore the activity of said catalyst, and thereafter returning the regenerated catalyst to the conversion zone.

4. In the process defined by claim 3, the further improvement which comprises combining a stripping gas containing the entrained gaseous products removed from said stripping zone with the vaporous reaction products withdrawn from said conversion zone.

5. In a process for the catalytic conversion of hydrocarbon oils wherein the oil in vapor form is passed upwardly through a conversion zone into which a stream of finely divided catalyst is continuously passed and wherein the velocity of the oil vapors rising through said conversion zone is limited to maintain a relatively dense layer of catalytic material and reaction vapors in the bottom portion of the conversion zone and a relatively dilute layer of reaction products and catalyst in the upper portion of the conversion zone, the improvement which comprises removing the stream of reaction products and entrained catalyst from the upper portion of the conversion zone, segregating the entrained catalyst from the reaction products, separately removing a relatively dense restricted stream of finely divided conversion catalyst containing entrained vaporous reaction products only from an upper portion of said dense layer of catalytic material in said conversion zone, passing the last-named stream to a stripping zone, said stripping zone being independent of the dilute layer in the conversion zone, passing a stripping gas through said stripping zone to remove entrained vaporous reaction products from said catalyst, passing the stripped catalyst through a regenerating zone, maintaining a vertical column of stripped catalyst between said stripping zone and said regenerating zone of a height sufficient to develop a substantial hydrostatic pressure at the base of said column, maintaining said column of catalyst in a fluidized state capable of generating a hydrostatic pressure at the base thereof, passing catalyst from the base of said column into said regenerating zone, and returning regenerated catalyst from said regenerating zone to said conversion zone.

6. In the process defined by claim 5, the further improvement which comprises maintaining a second vertical column of catalyst between said regenerating zone and said conversion zone, maintaining a fluidizing gas in admixture with the catalyst in said last-named column to maintain said catalyst in a fluidized state and passing catalyst from the base of said last-named column into said conversion zone.

7. The process defined by claim 5, the further improvement which comprises combining a stripping gas containing vaporous reaction products with the stream of reaction products removed from said conversion zone.

8. A continuous process for contacting gaseous reagents with finely divided solids which comprises passing a stream of gaseous reagents upwardly through a reaction chamber, continuously introducing a stream of finely divided solids to be contacted into said reaction chamber, limiting the velocity of the gases rising through said chamber to maintain a relatively dense turbulent layer of finely divided solids in the bottom portion of the reaction chamber and superimposed on said layer a relatively dilute phase of gaseous reaction products containing a small amount of finely divided solids entrained therein in the upper portion of the reaction chamber, continuously removing from the reaction chamber a restricted stream of solids containing entrained gaseous reaction products only from the upper portion of said dense layer in the bottom portion of the reaction chamber, passing the last-named stream downwardly into a stripping zone, said stripping zone being independent of the dilute phase in the reaction chamber, continuously separately withdrawing a stream of said gaseous reaction products containing a relatively small amount of entrained finely divided solids from the upper end of said reaction chamber, separating entrained solids therefrom at a level higher than the stripping zone, passing said separated solids directly into the stripping zone, continuously contacting the solids within said stripping zone with a stripping gas to remove gaseous reactants entrained therein, and subsequently discharging the stripped solids from said stripping zone.

CHARLES E. HEMMINGER.

REFERENCES CITED

The following references are of record in the file of this patent:

UNITED STATES PATENTS

| Number | Name | Date |
|---|---|---|
| 1,984,380 | Odell | Aug. 6, 1940 |
| 2,253,486 | Belchetz | Aug. 19, 1941 |
| 2,302,209 | Goddin | Nov. 17, 1942 |
| 2,303,047 | Hemminger | Nov. 24, 1942 |
| 2,304,128 | Thomas | Dec. 8, 1942 |
| 2,326,705 | Thiele et al. | Aug. 10, 1943 |
| 2,327,175 | Conn | Aug. 17, 1943 |
| 2,337,684 | Scheineman | Dec. 28, 1943 |
| 2,347,682 | Gunnes | May 2, 1944 |
| 2,353,731 | Kanhofer | July 18, 1944 |
| 2,367,694 | Snuggs | Jan. 23, 1945 |
| 2,378,542 | Edmister | June 19, 1945 |
| 2,385,446 | Jewell et al. | Sept. 25, 1945 |